United States Patent
Armangau et al.

(10) Patent No.: US 7,805,470 B2
(45) Date of Patent: Sep. 28, 2010

(54) METHODS AND APPARATUS FOR MANAGING THE STORAGE OF CONTENT IN A FILE SYSTEM

(75) Inventors: Philippe Armangau, Acton, MA (US); Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 80 days.

(21) Appl. No.: 11/165,104

(22) Filed: Jun. 23, 2005

(65) Prior Publication Data

US 2006/0294164 A1 Dec. 28, 2006

(51) Int. Cl.
*G06F 17/30* (2006.01)
(52) U.S. Cl. .................. 707/822; 707/823; 707/827
(58) Field of Classification Search .............. 707/3, 707/10, 205
See application file for complete search history.

(56) References Cited

U.S. PATENT DOCUMENTS

| | | | | |
|---|---|---|---|---|
| 5,893,140 A * | 4/1999 | Vahalia et al. | ...... | 711/118 |
| 7,024,531 B2 * | 4/2006 | Saika | ...... | 711/162 |
| 7,047,297 B2 * | 5/2006 | Huntington et al. | ...... | 709/224 |
| 7,373,345 B2 * | 5/2008 | Carpentier et al. | ...... | 707/9 |
| 7,392,235 B2 * | 6/2008 | Armangau et al. | ...... | 707/1 |
| 7,593,784 B2 * | 9/2009 | Carle et al. | ...... | 700/175 |
| 2003/0061504 A1 * | 3/2003 | Sprigg et al. | ...... | 713/200 |
| 2005/0125384 A1 | 6/2005 | Gilfix et al. | | |

FOREIGN PATENT DOCUMENTS

WO  WO 2004/074968 A2  9/2004
WO  WO 2005/020098 A1  3/2005

OTHER PUBLICATIONS

International Search Report and Written Opinion of the International Searching Authority issued Aug. 18, 2006.

* cited by examiner

*Primary Examiner*—Baoquoc N To
(74) *Attorney, Agent, or Firm*—Krishnendu Gupta; Robert Kevin Perkins

(57) ABSTRACT

One embodiment of the invention is directed to the containerization of content units that are accessed using an identifier. Applicants have appreciated that file systems sometimes impose limits on the number of files that may be stored therein that are too restrictive. Thus, in one embodiment, multiple content units may be stored in a single file, called a container file, in a file system. Each content unit may have an identifier associated with it. When an accessing entity requests access to a previously-stored content unit and provides the identifier for the content unit, the identifier may be used to locate the container file in which the content unit is stored.

57 Claims, 5 Drawing Sheets

| Entry 1 | Entry 2 | Entry 3 | Entry 4 | Entry 5 | Entry 6 | Entry 7 |
|---|---|---|---|---|---|---|
| 1 | 1 | 0 | 1 | 1 | 1 | 0 |

500

METHODS AND APPARATUS FOR MANAGING THE STORAGE OF CONTENT IN A FILE SYSTEM

FIELD OF THE INVENTION

The present invention relates to managing the storage of content.

DESCRIPTION OF THE RELATED ART

A file system is a logical data structure that may be used to organize data. A file system generally has a plurality of logical partitions, often referred to as directories or folders, that may be arranged in a hierarchy. In many file systems, there is a single directory at the top of the hierarchy, referred to as the root directory. Data may be arranged into logical units of storage, called files, which are stored in the file system's directories.

Typically, the file system is installed on a computer system having one or more underlying storage devices (e.g., a disk or a tape) on which the data is physically stored. The logical arrangement of files and directories in the file system may have little or nothing to do with the way the data is physically stored on the physical storage device. Thus, a map typically is used to map logical storage locations in the file system to the actual physical storage locations (e.g., blocks) on the storage device(s).

Many file systems impose limits on the number of files that may be stored in each directory and the total number of files that may be stored in the file system. These limits may be imposed by the file system for any number of reasons. For example, the performance of the file system may significantly decrease as the number of files increases. Further, the limit may be imposed, for example, to guarantee disaster recovery in a certain amount of time, if, for example, the file system data structure is lost and needs to be restored from a backup copy.

SUMMARY OF THE INVENTION

One embodiment of the invention is directed to a method of managing content units in a file system, the method comprising acts of: receiving a first request to store a first content unit, the first content unit having a first content address that is computed based, at least in part, on the content of the first content unit; in response to the first request, storing the first content unit in a file in the file system; receiving a second request to store the second content unit, the second content unit having a second address that is computed based, at least in part, on the content of the second content unit; and in response to the second request, storing the second content unit in the file. Another embodiment is directed to at least one computer readable medium encoded with instructions that, when executed on a computer system, perform the above-described method.

A further embodiment is directed to a computer that manages content units in a file system comprising: at least one input; and at least one controller coupled to the at least one input that: receives, via the input, a first request to store a first content unit, the first content unit having a first content address that is computed based, at least in part, on the content of the first content unit; in response to the first request, stores the first content unit in a file in the file system; receives, via the input, a second request to store the second content unit, the second content unit having a second address that is computed based, at least in part, on the content of the second content unit; and in response to the second request, stores the second content unit in the file.

Another embodiment is directed to a method of accessing a content unit having a content address that is based, at least in part, on the content of the content unit, wherein the content unit is stored in a file in a file system, the method comprising acts of: receiving a request to access the content unit, wherein the request identifies the content unit using an identifier, and wherein the file in which the content unit is stored stores at least one additional content unit, the at least one additional content unit having a content address that is based, at least in part, on the content of the content unit; locating the file in which the content unit is stored using the identifier; and locating the content unit in the file in which the content unit is stored. A further embodiment is directed to at least one computer readable medium encoded with instructions that, when executed on a computer system, perform the above-described method.

Another embodiment is directed to a computer that accesses a content unit having a content address that is based, at least in part, on the content of the content unit, wherein the content unit is stored in a file in a file system, the computer comprising: an input; and at least one controller, coupled to the input, that: receives, via the input, a request to access the content unit, wherein the request identifies the content unit using an identifier, and wherein the file in which the content unit is stored stores at least one additional content unit, the at least one additional content unit having a content address that is based, at least in part, on the content of the content unit; locates the file in which the content unit is stored using the identifier; and locates the content unit in the file in which the content unit is stored.

A further embodiment is directed to a method of storing content units in a hierarchical file system having a plurality of directories arranged in a hierarchical tree that has a plurality of levels, each of the plurality of levels corresponding to a unit of time, the hierarchical tree comprising at least one root directory and a plurality of non-root directories that each has a parent directory, wherein at least one of the plurality of directories in the tree correspond to a period of time subsumed by a period of time corresponding to its respective parent directory, the method comprising acts of: determining a rate at which content units are received for storage; and dynamically determining one of the plurality of levels at which to store content units based on the rate at which content units are received for storage. Another embodiment is directed to at least one computer readable medium encoded with instructions that, when executed on a computer system, perform the above-described method.

A further embodiment is directed to a computer that stores content units in a hierarchical file system having a plurality of directories arranged in a hierarchical tree that has a plurality of levels, each of the plurality of levels corresponding to a unit of time, the hierarchical tree comprising at least one root directory and a plurality of non-root directories that each has a parent directory, wherein at least one of the plurality of directories in the tree correspond to a period of time subsumed by a period of time corresponding to its respective parent directory, the computer comprising: an input; and at least one controller that: determines a rate at which content units are received through the input for storage; and dynamically determines one of the plurality of levels at which to store content units based on the rate at which content units are received for storage.

DETAILED DESCRIPTION

Applicants have appreciated that, in some situations, a file system-imposed limit on the number of files may be too restrictive to store all the desired data and it may thus be desired to store the data in the file system in a manner that does not violate the limit.

Thus, one embodiment of the invention is directed to containerization of logically distinct content units, so that multiple distinct content units can be stored in the same file. Content units that are logically distinct typically are stored in separate files in a file system. For example, each document that is created by a word processing application usually is stored in a separate file because these documents are logically separate from each other. However, in one embodiment of the invention content units that are logically separate may be containerized. That is, two or more content units that are logically separate may be stored in a single file, called a container file, in the file system. In one embodiment, each content unit that is stored in the container may have its own identifier (e.g., a file name or other identifier) so that an entity accessing the content (e.g., a human user, an application program, or a host computer) can use this identifier to access the content unit.

In one embodiment, the use of containers is transparent to entities storing and retrieving content units on the system, so that these users can store and retrieve content units without knowledge that the content units have been stored in container files with other content units, and may access the content units as if they were each stored in separate files.

The use of containers can decrease the number of files managed by the file system, and can allow a greater amount of data (grouped in container files) to be stored in the file system before reaching the limit on the maximum number of files permitted to be stored thereby.

Figure 1A:
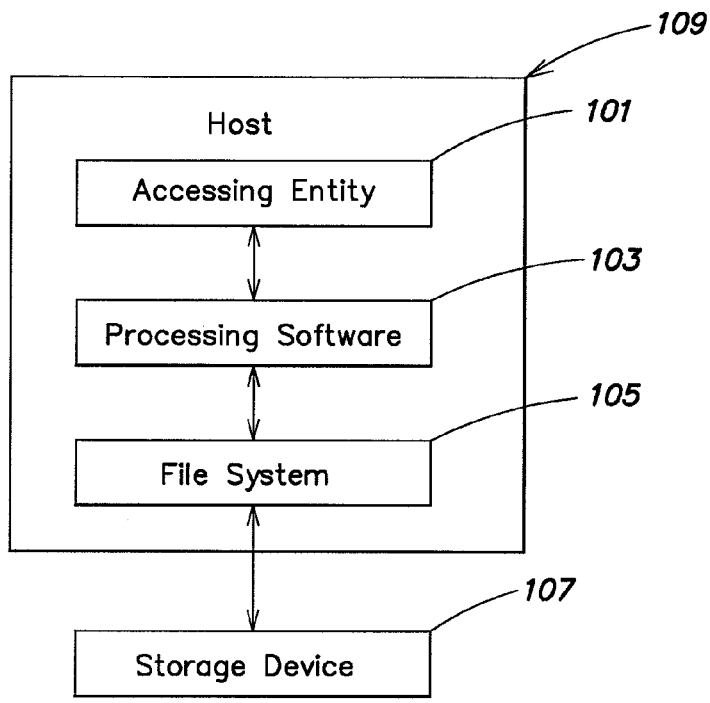
FIG. 1A is a block diagram of a system for containerizing content units, in accordance with one embodiment of the invention.

Using container files to store multiple content units may be done in any suitable way, as the invention is not limited to any particular implementation technique. For example, as shown in FIG. 1A, a host computer 109 may include an accessing entity 101 (e.g., an application program), processing software 103, and a file system 105. The accessing entity 101 may communicate with processing software 103 which stores and retrieves data from file system 105. The data that is logically stored in file system 105 may be physically stored on a storage device 107. When storing a content unit, accessing entity 101 may send the content unit to processing software 103 for storage. An identifier that has previously been associated with the content unit and of which accessing entity 101 is aware may be used by accessing entity 101 to later retrieve the content unit. Alternatively, the identifier may be assigned at the time of storage of the content unit in file system 105 by processing software 103 and returned to accessing entity 101 as acknowledgement of receipt of the request to store the content unit. Processing software 103 may receive the content unit from accessing entity 101 and may store the content unit in file system 105 in a container file that may also store other content units. If a container file that is suitable for storing the content unit does not exist, such a container file may be created and the content unit may be stored therein.

In the example of FIG. 1A, accessing entity 101, processing software 103, and file system 105 execute on host computer 109. However, the invention is not limited in this respect, as each of these layers may execute on a different computer or on any suitable combination of computers. For example, accessing entity 101 may execute on a storage system that replicates content units to host computer 109. Further, storage device 107 may be any suitable type of storage device and may be an internal storage device of host computer 109 or storage device external to host computer 109, as the invention is not limited in this respect.

Accessing entity 101 may be any type of entity that accesses content, as the invention is not limited in this respect. For example, accessing entity 101 may be, for example, an application program, a human user, another computer, or any other suitable entity. In one embodiment, accessing entity may be a storage system (not shown) that communicates with processing software 103 to replicate content units stored on the storage system to storage device 107.

The identifier that is associated with the content unit may be any suitable identifier, as the invention is not limited in this respect. The identifier may be, for example, a human-readable name, or any other suitable type of identifier. In one embodiment, the identifier is a content address that is computed based, at least in part, on the content of the content unit. For example, the content unit may be hashed (using any suitable hashing algorithm) and the hash value may be used as all or part of the content address. While in one embodiment the content address may include only the hash value with no additional information, the invention is not limited in this respect as the content address may include any other suitable information in addition to the hash value. For example, the content address may also include a timestamp that indicates a time at which the content unit was created or initially stored in the file system or on another storage system. The content address may also include, for example, a guaranteed unique identifier (GUID), which is a series of bits that are guaranteed to be unique and may be used to ensure that no two content addresses are identical. The content address may also include other information such as a flag that indicates what type of data is included in the content of the content unit. Examples of content addresses and the situations in which content addresses may be used are described in the applications listed in Table 1, each of which is incorporated by reference herein.

Storage device 107 may be any suitable type of storage device, as the invention is not limited in this respect. For example, storage device 107 may be a magnetic disk storage device, an optical disc storage device, a tape storage device, and/or any other suitable type of storage device. Similarly, any suitable file system software may be used to implement the file system 105, as the invention is not limited in this respect. In one embodiment, file system 105 is the StorNext™ file system sold by Advance Digital Information Corporation, having a place of business at 11431 Willows Road NE., Redmond, Wash., but the invention is not limited to this or any other particular file system.

In one embodiment, hierarchical storage management (HSM) may be employed. HSM is a technique by which data is automatically moved between more expensive, but faster storage devices (e.g., magnetic disk drives) and less expensive, but slower storage devices (e.g., optical disc drives and/or magnetic tape drives). Thus, in situations where it is prohibitively expensive to provide enough storage capacity on the faster storage devices, data may be stored on the slower storage devices and the faster storage device may be treated as a cache for the slower storage devices.

Figure 1B:
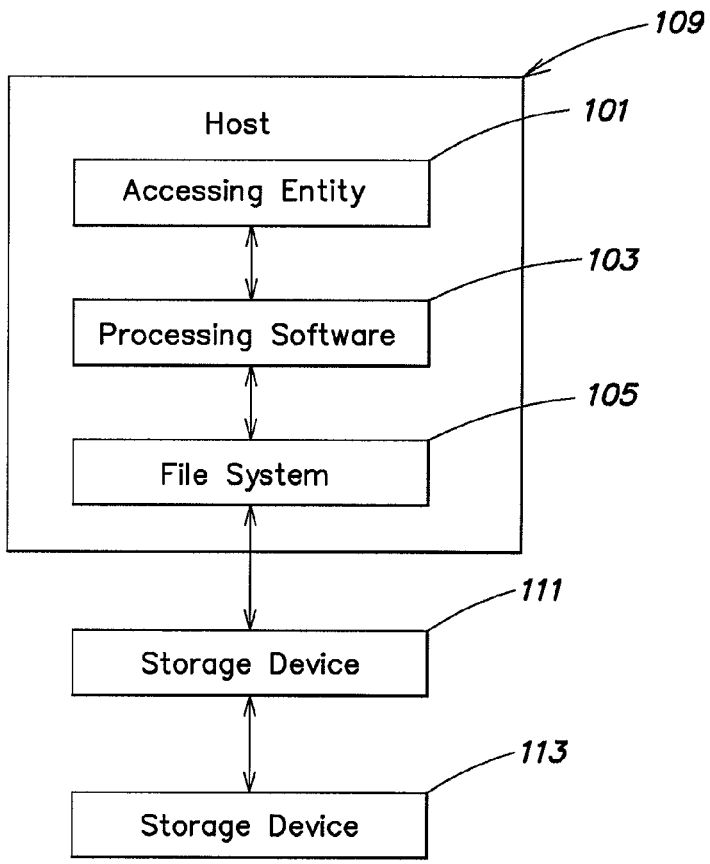
FIG. 1B is a block diagram of system for containerizing content units that employs hierarchical storage management techniques, in accordance with one embodiment.

An example of system that employs HSM techniques is shown in FIG. 1B. In FIG. 1B, logically stored in file system 105 may be stored on storage device 113 and a portion of this data may be cached on storage device 111. Thus, storage device 111 may be a more expensive, but faster storage devices, whereas storage device 113 is a less expensive, but slower storage devices. If processing software 103 requests a content unit stored logically in file system 103, if the content of that content unit is already cached on storage device 111, they the content may be retrieved from storage device 111. However, if the content is not already cached on storage device 111, then the content may be moved from storage device 113 into the cache (i.e., storage device 111) and may be returned to processing software 103.

In one embodiment, file system 105 is responsible for performing the HSM functions, although the invention is not limited in this respect. For example, file system 105 may allow a user to configure policies for certain directories and/or files that specify when and for how long the data stored in those directories and/or files should be kept in the cache (i.e., stored on storage device 111) and/or when that data should be moved to the storage device 113. File system 105 then moves the data between storage device 111 and storage device 113 in accordance with this policy.

As discussed above, processing software 103 may either store a new content unit in an existing container file or create a new container file in which to store the content unit. The decision as to whether to store the content unit in an existing container file or a new container file may be made in any suitable way, as the invention is not limited in this respect. Examples of techniques for making this decision are discussed below in greater detail. Processing software 103 may select any suitable container file in which to store a content unit and may select any suitable directory in file system 105 in which to store a container file, as the invention is not limited in this respect. Examples of techniques for selecting a directory in which to store a container file are discussed below in greater detail.

When accessing entity 101 desires to retrieve a previously-stored content unit, accessing entity 101 may provide the identifier associated with the content unit to processing software 103. Processing software 103 may determine in which container file the content unit is stored, access the container file, locate the requested content unit in the container file, and return the content unit to the accessing entity 101. Processing software 103 may locate the appropriate container file in any suitable way, as the invention is not limited in this respect. Similarly, processing software 103 may locate the requested content unit within a particular container file in any suitable way, as the invention is not limited in this respect. Examples of techniques for locating the container file in which a particular content unit is stored and for locating a content unit within a container file are discussed below in greater detail.

The accessing entity 101 may perform any of numerous types of access requests to a content unit stored in file system 105 using the identifier associated with the content unit, including reads, writes, and query requests. A query request is a request to identify and/or return content units that satisfy one or more criteria specified in the request. An example of one type of query request that may be issued by accessing entity 101 is a time-based query request. A time-based query request is a request to identify and/or return content units that were stored during a particular time range. In accordance with one embodiment, in response to a time based query request, processing software may locate container files that include content units stored during the time range specified in the request and return the identifiers of such content units and/or the content units themselves. This may be done in any suitable way, as the invention is not limited in this respect. Examples of techniques for processing and responding to query requests are discussed below in greater detail.

In one embodiment, the file system 105 may have a time based directory structure that may be used to logically store container files. A time based directory structure is one in which directories and files are organized based, at least in part, on the time at which the content units were stored and/or created by the source (e.g., an application program). Any suitable time based directory structure may be used, as the invention is not limited in this respect. In one embodiment, the time-based directory structure may be organized as a plurality of hierarchical directories, where each directory represents a period of time and each subdirectory represents a period of time that is subsumed by the period of time of its parent directory. Files may be stored in the bottom-level or "leaf" directories (i.e., directories that represent the smallest units of time) and the leaf directory in which a particular file is stored may be selected based on a time of storage or a time of creation of the file.

Figure 2:
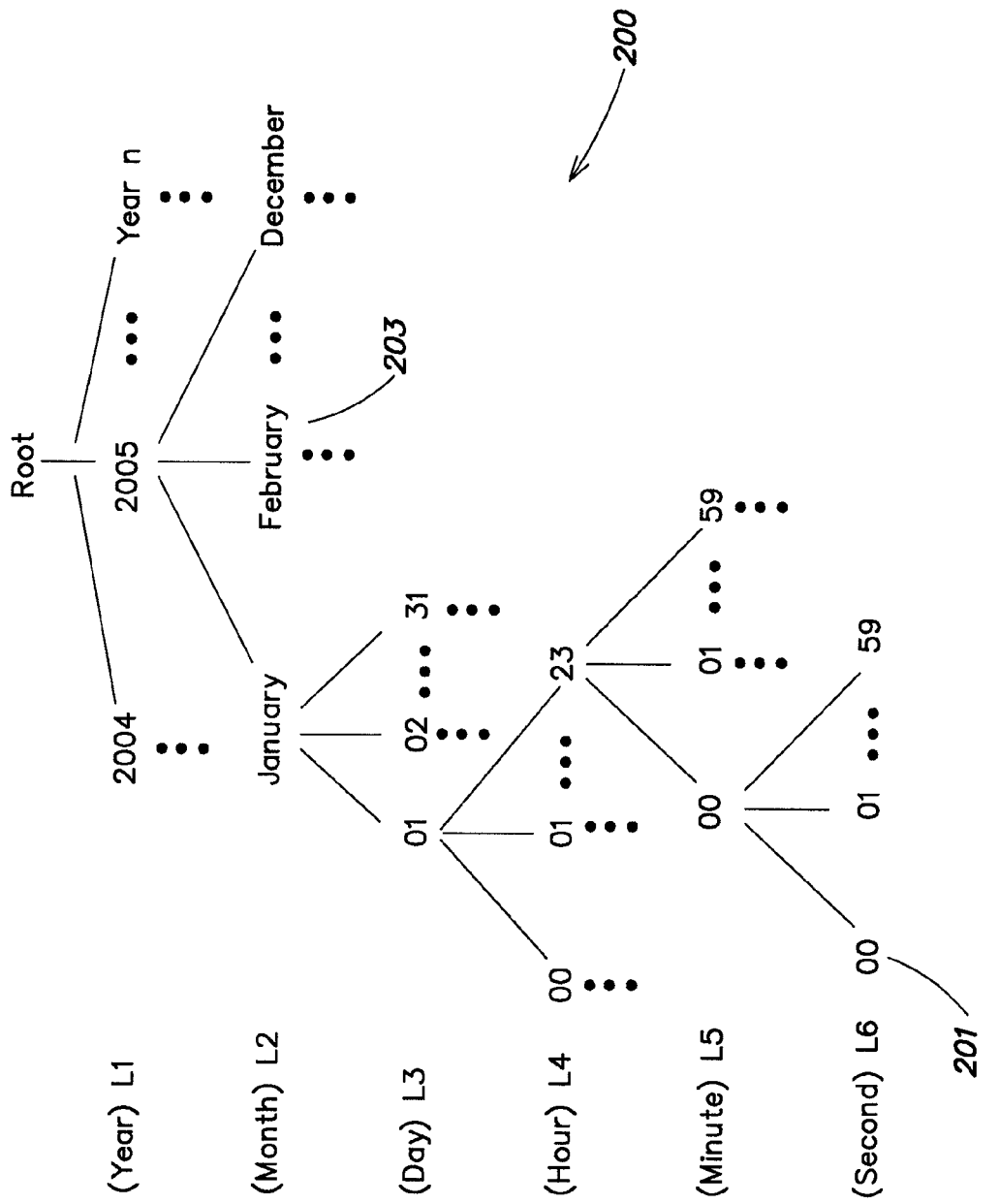
FIG. 2 is a diagram of an example of a time-based directory structure which may be employed in embodiments of the invention.

An example of such a time based directory structure is shown in FIG. 2. FIG. 2 shows a directory structure 200 having six levels (labeled L1-L6), wherein directories at level L1 designate the year in which the file was stored, directories at level L2 designate the month, directories at level L3 designate the day, directories at level L4 designate the hour, directories at level L5 designate the minute, and directories at level L6 designate the second. It should be appreciated that the entire hierarchy of directories in directory structure 200 is, for the sake of clarity, not expanded and that each non-leaf directory shown in FIG. 2 may have one or more subdirectories that are not shown in FIG. 2.

As discussed above, files may be stored in the leaf directory that corresponds to the time at which they were stored and/or created. Thus, for example, a file stored on Jan. 1, 2005 at 11:00 PM may be stored in the L6 directory 201, which has a path of /2005/January/01/23/00/00, wherein "2005" is the L1 directory corresponding to the year 2005, "January" is a subdirectory of the 2005 directory corresponding to the month of January 2005, the subdirectory "01" of the "January" directory is the L3 directory corresponding to the 1$^{st}$ day of January 2005, the subdirectory "23" of the "01" directory is the L4 directory corresponding to the 24$^{th}$ hour of the 1$^{st}$ day of January 2005, the subdirectory "00" of the "23" directory is the L5 directory corresponding to the 1$^{st}$ minute of the 24$^{th}$ hour of the 1$^{st}$ day of January 2005, and the subdirectory "00" of the "00" L5 directory is the L6 directory corresponding to the 1$^{st}$ second of the 1$^{st}$ minute of the 24$^{th}$ hour of the 1$^{st}$ day of January 2005.

It should be appreciated that the embodiments of the present invention described below that employ time in specifying a directory structure for storing content units are not limited to use with directory structures having the arrangement of the particular example shown in FIG. 2, as the embodiments of the present invention can be implemented in any of numerous ways, including with directory structures using different units of time (or different granularities) as establishing boundaries for the subdirectory levels.

In the example of FIG. 2, the hierarchical directory structure has six levels and the smallest unit of time granularity (i.e., the lowest level in the hierarchy) corresponds to the second in which a content unit was stored. However, as mentioned above, embodiments of the invention described herein are not limited in this respect, as they can be used with directory structures having any suitable number of levels, with each level corresponding to any suitable unit of time. For example, the directory structure may include only four levels, with the smallest unit of time granularity being hours. In this respect, the total number of directories may be reduced (as compared to a directory structure with six levels) and the number of content units stored in each "leaf" directory may increase. Alternatively the number of levels in the hierarchy may be increased to, for example, seven levels with the lowest level of granularity corresponding to milliseconds or some other sub-second unit of time. As a result, the number of "leaf" directories may be increased and there may be fewer content units stored in each "leaf" directory.

Applicants have appreciated that the number of content units stored in each leaf directory may affect the performance of the system. As discussed above, the file system may map locations in the file system directory structure to physical storage locations (e.g., blocks). The mapping information that the file system uses to do this may be large, such that it may not be possible and/or feasible to store the entire map in the memory of the computer on which the file system is executing. Thus, only parts of the map may be cached in memory at any particular point in time, while the rest remains stored on non-volatile storage (e.g. disk) used by the computer on which the file system executes. If there are a large number of directories and only a small number of content units stored in each directory, then it is less likely that the file system location of a content unit to be retrieved will be in the portion of the map that is cached. As a result, the file system may have to frequently retrieve the relevant portions of the map from disk, resulting in a decrease in performance. However, if the number of directories in the directory structure is small and there are a large number of content units in each directory, the time spent locating the desired content unit within the appropriate directory may be increased, resulting in a decrease in performance.

It may be desirable to select a directory structure that balances these two competing factors. The optimum number of levels in the hierarchical structure may depend, for example, on the number of content units stored in the directory structure, the distribution of content units across the directory structure, and the frequency at which content units are stored in the directory structure. Thus, in one embodiment, the number of levels in the directory hierarchy is configurable and is alterable during operation of the system. This may be accomplished in any suitable way. For example, increasing the number of levels can be accomplished by creating additional subdirectories for each leaf directory and moving content units down into the appropriate additional subdirectories and decreasing the number of levels can be accomplished by moving content units up into a parent directory of the subdirectory in which they are stored and removing the subdirectory from the hierarchy.

Figure 3:
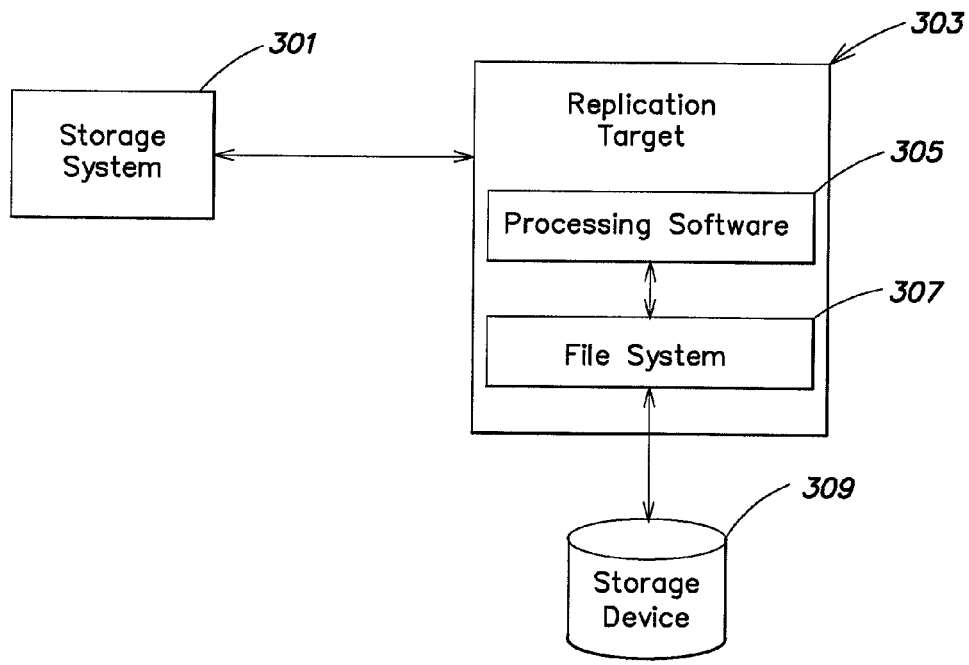
FIG. 3 is a block diagram of a system in which replicated content units may be containerized, in accordance with one embodiment.

In one embodiment, a time based directory structure that employs the containerization aspects of the present invention may serve as a replication target for a storage system. It is often desirable to create copies of content units stored on a storage system on a storage device that is external to the storage system so that, in case of unrecoverable failure of the storage system (or components thereof), a backup copy of the data exists. As used herein, replication of a content unit refers to creating a copy of the content unit on a storage device external to the storage system. An exemplary replication system is shown in FIG. 3, wherein a storage system 301 replicates content units to replication target 303. In accordance with one embodiment of the invention, replication target 303 includes processing software 305 which processes access requests from storage system 301 (for example, as described above in connection with FIG. 1A) and stores content units in and retrieves content units from container files in file system 307. Files logically stored in file system 307 may be physically stored on underlying storage device 309.

It should be appreciated that although in FIG. 3, replication target 303 using only a single storage device 309, the invention is not limited in this respect. Indeed, replication target 303 may use multiple storage devices, and these storage devices may be arranged in a hierarchical fashion, such that the HSM techniques described above in connection with FIG. 1B may be employed.

In one embodiment, the frequency at which content units are replicated from storage system 301 to replication target 303 may be used to determine the number of levels in the hierarchy and the granularity of the leaf levels in the file system 307. For example, if it is determined that, on average, thirty content units per second are replicated to replication target 303 and it is desired to store approximately ten content units in each container file, then if the file system 307 were using the time-based directory structure shown in FIG. 2, there may be, on average, three container files in each leaf directory. If it is desired to increase the number of files in each leaf directory, then the granularity of the L6 directories maybe increased such that each directory represents a period of time greater than one second. For example, each leaf directory may represent a period of five seconds, such that each L5 directory has twelve subdirectories, rather than sixty subdirectories. As a result, each leaf directory may store, on average, fifteen content units rather than three content units. Alternatively, the number of levels in the hierarchy of directory structure 200 may be reduced. For example, the files stored in each L6 directory may be moved to its parent L5 directory and the L6 directory may be removed. Thus, each L5 leaf directory will, on average, store one hundred eighty files, rather than the three files previously stored by each L6 leaf directory.

In the example described above, the time-based directory structure was altered based on the rate at which content units were replicated to the replication target. However, the invention is not limited in this respect as the time-based directory structure may be altered to manage the number of files in each directory and the number of container files in each directory for any reason. For example, the time-based directory structure may be altered based on the frequency at which write requests for initial storage of content units (as opposed to write requests for replication of content units) are received. It should be appreciated that techniques for altering the time-based directory structure are not limited to use with container files, as the time-based directory structure may be also be used with files that include only a single content unit. In this respect, the number of files in directories may be managed by altering the time-based directory structure and/or storing files in non-leaf directories in the time-based directory structure.

The time-based directory structure may be managed to control the number of files stored in directories either manually or automatically, as the invention is not limited in this respect. When managed manually, a user may specify what time granularity the leaf directories in the directory structure should have and the system may alter the time-based directory structure based on this specification. In one embodiment, when a user changes the time granularity, the time granularity may be altered for directories that correspond to future times. That is, the portion of the directory structure that has already been created and/or already store files may not be altered based on the new granularity specification. However, the invention is not limited in this respect, as in one embodiment, both future time and past time directories may be altered to have the newly specified granularity.

When managed automatically, the system may automatically select the time granularity of the leaf directories based on the frequency at which content units are written to the system. This may be done in any suitable way, as the invention is not limited in this respect. In one embodiment, the system may select a granularity of the leaf directories at which to store content units based on the current frequency at which content units are being received for storage. If the frequency increases, the granularity of the leaf directories may be changed, for example, by creating subdirectories of the current leaf directories, but that have a smaller time granularity. For example, the system may determine that content units are being received with a frequency of sixty per hour and may thus elect to limit the directory structure for future directories to four levels with the leaf directory having a time granularity of hours. Thus, if write requests continue to be received at this rate, then sixty content units may be stored in each leaf directory. It should be appreciated that if content units are containerized, then multiple content units may be stored in a single container file, such that there may be less than sixty files in the directory (depending on how many content units are stored in each container file). However, this aspect of the invention is not limited to use with container files, as each content unit may be stored in a separate file.

If the number of content units received for storage subsequently increases, the directory structure may be expanded. That is, for example, if the leaf directory currently has a granularity of hours and the frequency of requests increases from, for example, sixty per hour to six hundred per hour, then subdirectories of the current hours directory may be created, wherein each of these subdirectories corresponds to a minute within the hour represented by its parent directory. In this way, the time granularity may be decreased to minutes and subsequently received content units may be stored in the minutes directory. The time-based directory structure may continue to be created with leaf directories representing minutes. If the frequency at which write requests are received later decreases, minutes directories may no longer be created and content units may again be stored in the hours directories.

In the example above, because the time-based directory structure is expanded as time progresses (i.e., additional directories are created to represent the new times), the number of the levels in directory structure and the granularity of the leaf levels may be dynamically altered. Thus, a first portion of the directory structure that correspond to a first period of time may have a different number of levels than a second portion of the directory structure that corresponds to a second period of time. Further, because the decision to expand or contract the directory structure may be made at any time, a directory may not have a complete set of leaf directories. For example, if content units are being stored in the leaf hour directory that corresponds to the time period from 1:00 PM-1:59 PM on a certain day, and a decision is made to decrease the granularity to minutes starting at 1:30 PM, there will only be thirty leaf subdirectories of the hours directory (i.e., one subdirectory for each minute from 1:30 PM-1:59 PM). That is, content units stored from 1:00 PM-1:29 PM may be stored in the parent hours directory, while content units stored from 1:30 PM-1:59 PM may be stored in one of the minutes subdirectories of the hour directory representing the time period from 1:00 PM-1:59 PM. Thus, the hours directory may have only thirty subdirectories, each having a time granularity of one minute, instead of sixty subdirectories (i.e., one subdirectory for each minute in the hour).

It should be appreciated that, in the example above, content units may be stored in leaf directories of the directory structure and/or non-leaf directories. Thus, in one embodiment, when requests to read content units stored in the time-based directory structure are subsequently received, non-leaf directories may also be searched to locate content units identified by the requests.

In one embodiment a go-deeper file that indicates that a directory has subdirectories which contains content units may be employed to aid in locating content units on subsequent read requests. This may be done in any suitable way, as the invention is not limited in this respect. For example, as discussed above, when content units are being stored in a directory having a first time granularity, it may be decided that the time granularity of directories should be decreased by creating a new level of subdirectories that have smaller time granularities and storing content units in these subdirectories. A go-deeper file may be created and stored in the parent directory of these subdirectories. In one embodiment, when a read request that identifies a content unit is received, the content unit may be located, for example, by determining the period of time at which the content unit was stored and locating the highest level directory in the time-based directory structure that corresponds to the storage time and that stores content units. If the content unit is not found in the highest level directory corresponding to the storage time that has content units stored therein, it may be determined whether there is a go-deeper file in the directory. If there is a go-deeper file, then the subdirectory of the highest level directory that corresponds to the period of time may be searched to locate the content unit. This subdirectory might also contain a go-deeper file.

In one embodiment, the go-deeper file may indicate the time at which a decision to expand the directory structure (e.g., by adding an additional level into the hierarchy) was made. Thus, on a read request for a content unit having a content address that includes a timestamp that indicates a time later than the time specified in the go-deeper file, processing software 305 may proceed to the appropriate subdirectory at the lower level, without having to examine content units in the directory of the go-deeper file.

In the example described above, the granularity of the directory structure is altered based on the frequency at which content units are received for storage. However, the invention is not limited to this respect, as the granularity may be determined based on any suitable criterion or criteria.

It should be appreciated that the scenarios provided above are merely examples of ways in which a time based directory structure may be configured to impact the number of files that are stored in each directory. The invention is not limited to these particular examples, as any suitable directory structure may be used.

In the examples above, an average of thirty content units per second were replicated to the replication target 303 and container files were expected to store ten content units each. It should be appreciated that the replication rate and the expected number of content units in each container file were provided only as examples, and any suitable replication rate and/or number of content units may be used. For example, it may be expected that a container file store fifty, seventy-five, one hundred, or any other suitable number of content units.

In the examples above, the directory structure 200 was altered to increase the number of files stored in each directory. It should be appreciated that directory structure 200 may also be altered to decrease the number of files stored in each directory. This may be done in any suitable way. For example, the time period represented by each leaf directory may be increased or an additional level of directories may be added to the hierarchy with a smaller granularity time period.

In FIG. 3, replication target 303 serves as the replication target for one storage system (i.e., storage system 301). However, it should be appreciated that the invention is not limited in this respect, as replication target 303 may serve as the replication target for any suitable number of storage systems. Replication target 303 may be a storage system, a host computer, an appliance, or any other suitable entity. In this respect, the storage device 309 may be an internal storage device of replication target 303, such as, for example, a disk drive, or may be an external storage device, such as an external tape storage device, attached to the replication target 303.

In one of the examples described above, container files were referred to as having a limit on the content units stored therein. The recognition that a container file should not store additional content units and that a new container file should be created may be made in any suitable way, as the invention is not limited in this respect. For example, processing software 305 may impose a limit on the number of content units stored in a particular container file. Alternatively, in one embodiment, a new container file may be created after a certain amount of time has elapsed. The time interval at which to create new container files may be based on, for example, the desired average number of content units stored in each container file. That is, for example, if it is known or determined that replication target 303 receives, on average, thirty content units per second for replication and it is desired to have approximately one hundred fifty content units in each container file, then a new container file may be created, for example, every five seconds.

Figures 5, 6:
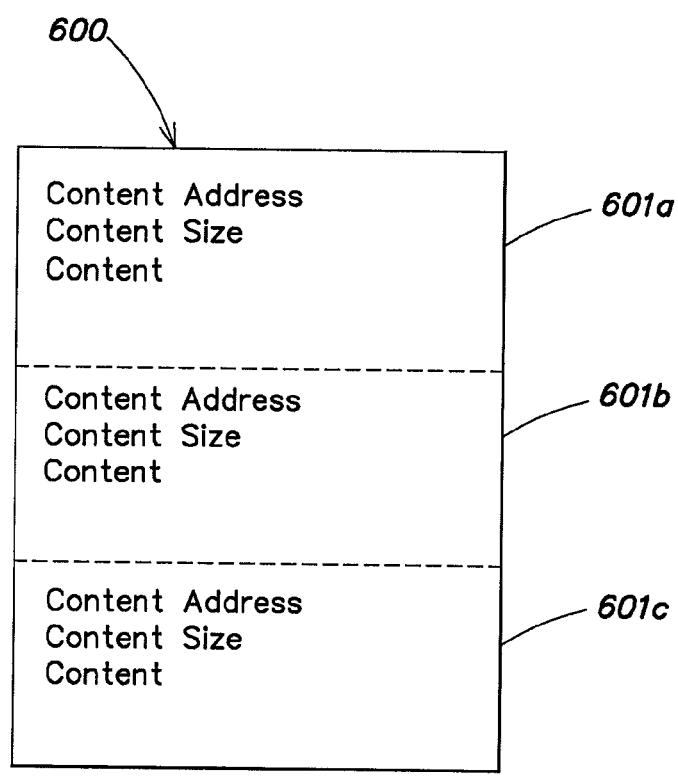
FIG. 5 is a block diagram of an example of a deletion data structure, in accordance with one embodiment.
FIG. 6 is a block diagram of an example of a container file, in accordance with one embodiment.

In one embodiment, a container file may include information in addition to the content units themselves. Any suitable information may be included, as the invention is not limited in this respect. For example, in addition to the content units, a container file may include the content addresses of content units stored therein and a size of each content unit. An example of container file 600 is shown in FIG. 6. In the example of FIG. 6, container file 600 stores three content units and thus has three entries 601*a,* 601*b,* and 601*c* (i.e., one entry for each content unit). Each entry in container file 600 includes three piece of information: the content address of the corresponding content unit; the size of the content of the content unit; and the content of the content unit.

The serial organization of entries in container file 600 is only one example of a way in which entries in a container file may be organized. It should be appreciated that container files may be organized in any suitable way, as the invention is not limited in this respect.

Processing software 305 (FIG. 3) may select a directory in which to store a container file in any suitable way. For example, in embodiments where file system 307 includes a time based directory structure, a container file may be stored in the time based directory in the leaf directory that corresponds to the time at which the container file was created. In this respect, in embodiments where a new container file is created after a certain time interval, the time period of the leaf directory in which the container file is stored may be greater than the time interval at which new container files are created. Thus, content units that are stored in the container file are also stored in the leaf directory that corresponds to the time of storage of the content units. For example, if a leaf directory corresponds to a time period of thirty seconds (e.g., Mar. 20, 2005 at 11:30:00-Mar. 20, 2005 at 11:30:29) and a new container file is created every five seconds, there may be six container files in the leaf directory and any content units received by replication target 303 during the thirty second time period that the leaf directory represents may be stored in one of the six container files in the leaf directory. By contrast, if a leaf directory corresponds to a time period of one second, but the time interval at which new container files are created is five seconds, then only one out of every five leaf directories may store a container file. Consequently, content units that were received by replication target 303 during a time period that is represented by a leaf directory which does not store a container file may be stored in a leaf directory that does not correspond to the period of time during which the content unit was received by replication target 303.

While the invention is not limited to storing a content unit in a container file that is stored in a directory that corresponds to the time period during which the content unit was received, doing so may aid in locating a particular content unit in the container file in which it is stored, as is described below in greater detail.

A container file may have any suitable filename, as the invention is not limited in this respect. In one embodiment, the filename of a container file may be a timestamp that indicates a time at which the container file was created. However, any other suitable filename may be used.

In embodiments of the invention where content units are replicated to a replication target (e.g., as shown in FIG. 3), there may be two storage times associated with a content unit. First, the content unit may have a storage time that reflects the time at which the content unit was initially stored on storage system 301. Second, the content unit may have a storage time that reflects the time at which the content unit was stored on replication target 303. Thus, in embodiments of the invention which use as the identifier for a content unit a content address that includes timestamp information, because the content unit was initially stored on storage system 301 (i.e., when the content address was initially assigned), timestamp information included in the content address may reflect the initial time of storage on storage system 301 and not the time of storage on replication target 303. However, the container file in which the content unit is stored and, consequently, the time-based directory in which the content unit is stored on the replication target 303 is based on the time of storage of the content unit on replication target 303, and not the time indicated by the timestamp in the content address.

The timestamp in the content address of content unit stored on the replication target may not, by itself, indicate in which time based directory a content unit is stored, as the time-based directory is selected based on a storage time on the replication target, whereas the timestamp reflects the storage time on the replication source (i.e., the storage system). Thus, in one embodiment, in addition to employing container files to store content units, one or more container index files may be created and stored in the directory structure of the replication target. The directory in which a container index file is stored may be based on the timestamps of the content addresses of content units referenced by the container index file (i.e., the time of storage on storage system 301). For example, when a request is received by replication target 303 to store a content unit, processing software 305 may store the content unit in a container file located in one of the time based directories in 307, that corresponds to the period of time during which the content unit was received for storage by replication target 303. Additionally, an entry may be made in a container index file that identifies the content unit by its content address and indicates in which container file the content unit is stored. The container index file may be stored in a time based directory that corresponds to the time at which the content unit was initially stored on storage system 301.

In one embodiment, the content address of a content unit may not include a timestamp. Thus, the initial time of storage of the content unit on storage system 301 may not be known. Thus, creating an index entry in a time-based file system for the content unit may present challenges. In one embodiment, a hash function that takes as input a content address or a portion of a content address and outputs a time value is used. The content address or a portion of the content address may be input to the hash function and the time based directory corresponding to the time value output by the hash function may be selected. The container index file may be stored in the selected time-based directory. Thus, the container index file is not necessarily stored in the directory selected based upon the time at which the content unit was initially stored on storage system 301, but rather a directory selected upon the time value generated by the hash function. Thus, an entry in a container index file stored in a directory in a time-based directory structure may be made for a content unit even where there is no timestamp information in the content address and the initial time of storage on the storage system may not be known. While subsequent examples may refer to the container index file and associated files being stored in a directory that corresponds to the time at which a content unit was initially stored on storage system 301, it should be appreciated that the container index file and associated files may be stored in a directory corresponding to the time value generated by the hash function.

When a request to access the content unit is later received and identifies the content unit by its content address, processing software 305 may locate the container index file that references the content unit using the timestamp information in the content address or, if the content address does not include a timestamp, using the hash function to generate a time value from the content address and may locate an entry in the container index file that corresponds to the content unit. This entry may identify the container file in which the content unit is stored and/or provide a pointer to this container file. Thus, rather than searching all container files for the content unit that has the content address specified in the request, a pointer to the appropriate container file may be located using the timestamp information in the content address and an exhaustive search for the container file need not be performed.

The use of container index files may be particularly beneficial in systems which employ HSM techniques. For example, if container files are stored on the slower storage device and it were necessary to search all container files to locate a particular content unit, then many container files (which are typically much larger than container index files, as they contain content units) may have to be transferred between the slower storage device into the cache (i.e., the faster storage device). The use of container index files allows processing software 305 to determine in which container file a requested content unit is stored, and thus it is not necessary to move many large container files from the slow storage device (e.g., a tape system) to the faster storage device (e.g., a magnetic disk drive). Rather, only the container file that includes the content may be moved from the slow storage device to the faster storage device, if it is not already stored on the faster storage device.

Figure 4:
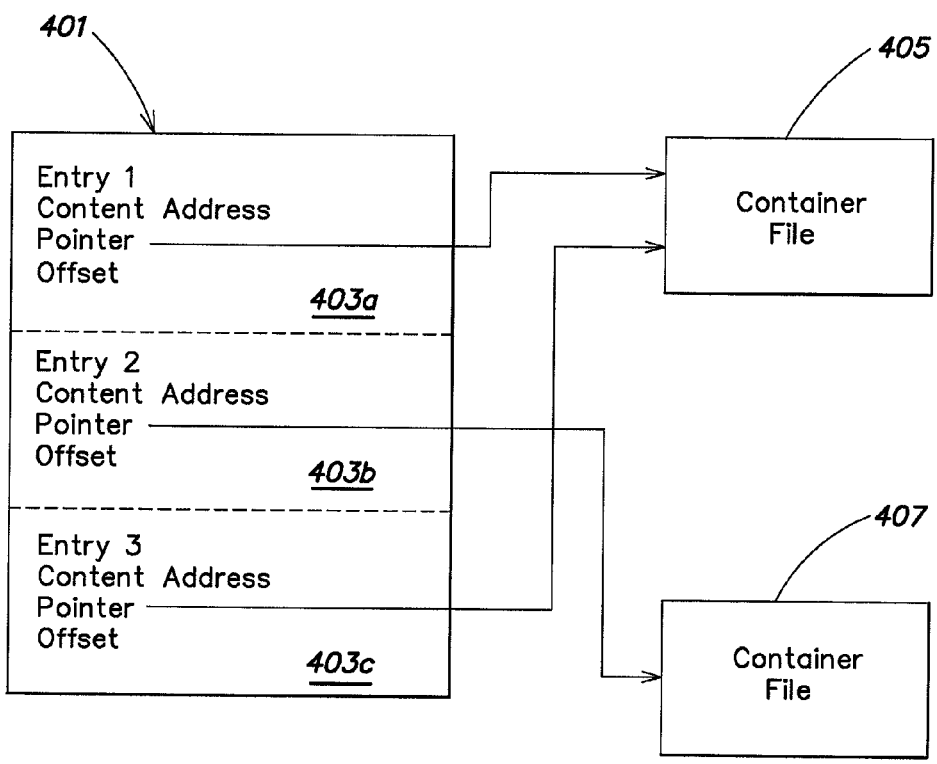
FIG. 4 is a block diagram illustrating the relationship between a container index file and a container file, in accordance with one embodiment.

FIG. 4 shows one example of a relationship between a container index file 401 and container files 405 and 407. Container index file 401 includes a plurality of entries, 403a, 403b, and 403c, each of which identifies a content unit by its content address and also includes information that may be used to locate the content unit. In one embodiment, this information includes a pointer that specifies the location of the container file in which the content unit is stored and an offset within the container file at which the content unit begins. Thus, for example, entry 403a may include a pointer to container file 405 and may indicate that the corresponding content unit begins a certain number of bytes into the container file. In addition, an entry in a container index file may also include information that indicates the next index with the same hash as the current entry. It should be appreciated that some of this information need not be included in the container index file and any other suitable information may be included in the index file, as the invention is not limited in this respect.

In one embodiment, the container index file may have any suitable number of entries, wherein each entry identifies a content unit and the container file in which it is stored. However, the invention is not limited to this situation, as the container index file may have any suitable form. In one embodiment, each container index file may correspond to a particular time period. Thus, a container index file may include entries for content units whose content addresses include timestamps that fall within the time period of the container index file. The time period that corresponds to a container index file may be of any suitable duration, as the invention is not limited in this respect. However, in one embodiment, the duration of the time period of a container index file is less than or equal to the duration of the time period represented by the leaf directory in which the container index file is stored. For example, if a container index file is stored in a leaf directory in a time based directory structure wherein the lowest level leaf directories correspond to a time period of thirty seconds, then the container index file may correspond to the same time period or a shorter time period. Thus, when an entry for a content unit is made in the container index file that corresponds to a time period encompassing the time indicated by the timestamp in the content unit's content address, the container index file will be stored in a leaf directory that also encompasses the time indicated by the timestamp in the content unit's content address.

A container index file may also have any suitable filename, as the invention is not limited in this respect. In one embodiment, a container index file may have a filename that indicates the period of time to which the container index file corresponds. It should be appreciated that this is only one example of a filename that may be used and the invention is not limited to this particular example.

In embodiments of the invention where the container index file corresponds to a time period shorter in duration than the duration of the time period represented by the leaf directory in which it is stored, there may be multiple container index files in a leaf directory. For example, if a leaf directory represents a thirty second time period (e.g., Mar. 20, 2005 at 11:30:00-

Mar. 20, 2005 at 11:30:29) and each container index file corresponds to a fifteen second time period, then there may be two container index files in the leaf directory: one that corresponds to the Mar. 20, 2005 at 11:30:00-Mar. 20, 2005 at 11:30:14 time period and another that corresponds to the Mar. 20, 2005 at 11:30:15-Mar. 20, 2005 at 11:30:29 time period.

The duration of the time period of a container index file may be selected in any suitable way, as the invention is not limited in this respect. For example, in one embodiment the duration may be selected to correspond to the interval at which new container files are created. Thus, for example, if a new container file is created every five seconds, then the duration of the time period of a container index file may also be five seconds. Alternatively, the duration may be selected based on the maximum number of desired container index files in a leaf directory. That is, for example, if the duration of the time period represented by the leaf directory is thirty seconds, and it is desired to have a maximum of five container index files in the leaf directory, then the duration of the time period of each container index file in the leaf directory may be six seconds. These are just examples of ways in which the duration of the time period of a container index file may be selected and any other suitable way may be used. For example, all container index files need not be of the same duration.

Processing software 305 need not create container index files if replication target 303 does not store any content units that would have entries in the container index files. Thus, for example, if replication target 303 does not store any content units whose content addresses have a timestamp that indicates a time of storage between Mar. 20, 2005 at 11:30:15 and Mar. 20, 2005 at 11:30:29, then it may not be necessary to create a container index file that corresponds to the Mar. 20, 2005 at 11:30:15-Mar. 20, 2005 at 11:30:29 time period, as there would be no entries in the container file if it were to be created.

Similarly, it should be appreciated that a directory in the time-based directory structure need not be created if there are no files to be stored in the directory. For example, referring to directory structure 200 in FIG. 2, there is a subdirectory 203 in the directory structure that corresponds to February 2005. If there are no content units initially stored on storage system 301 during February 2005 and no content units replicated to replication target 303 during February 2005, then subdirectory 203 (and all of the subdirectories that would normally descend therefrom in the hierarchy) need not be created.

In one embodiment, each container index file may also have an associated header file, called an index header file, that may be used to aid in locating a particular entry within the container index file and to aid in deletion of content units. To aid in locating an entry in the container index file, the index header file may include, for example, an array of pointers into the container index file. Each pointer in the array may indicate the location of an entry in the container index file and the array may be organized, for example, based on hashes of the content addresses stored in entries in the container index file. Thus, to locate an entry in the index container file using a content address of a corresponding content unit, the content address may be hashed to determine the location of the pointer to the entry in the array. The pointer may then be used to determine the location of the entry in the container index file that corresponds to the hashed content address.

The index header file may also include information helpful in managing deletion of content units. In one embodiment of the invention, deletion may be handled as follows. When processing software 305 receives a request to delete a content unit and identifies the content unit by its content address, rather than locating the content unit and removing its corresponding entries from the appropriate container file and container index file, the entries may remain in the files and a notation that the content unit has been deleted may be recorded so that subsequent requests to access the content unit may be denied. Such a notation may be made in any suitable way, as the invention is not limited in this respect. In one embodiment, the notation may be recorded in the index header file.

For example, as shown in FIG. 5, a deletion data structure 500 may be stored in the index header file. The deletion data structure associates a bit with each entry in the index container file associated with the index header file. If the bit for an entry is at one value (e.g., has a value of '1'), then the entry has not been deleted, whereas if the bit for an entry is at the other value (e.g., has a value of '0'), then the entry has been deleted. When processing software 305 receives a request to store a content unit and creates an entry corresponding to the content unit in a container index file, processing software may also add a bit for this entry in the deletion data structure 500 in the corresponding index header file with the bit initially set (i.e., having a value of '1'). When a subsequent request to delete the content unit is received, the bit may be reset to a value of '0' indicating that the content unit has been deleted. As a result, when processing software 305 receives a subsequent request to read the data, processing software may check the deletion data structure 500 in the index header file to determine if the content unit has been deleted prior to returning the content unit. If it is determined that the content unit has been deleted, a response indicating that the content unit does not exist and/or that the content unit has been deleted may be returned to the accessing entity.

The index header file may also include any other suitable information, such as the current number of entries in its associated container index file. Further, the example of the deletion data structure described above is only one implementation of a data structure that may be used to track which content units have been deleted. The invention is not limited to this particular example, as the deletion data structure may take any suitable form.

As mentioned above, although in one embodiment individual entries from container index files and container files are not removed in response to a delete request, an entire container index file and index header file may be deleted if a delete request for each entry in the container index file has been received. For example, as mentioned above, a container index file may have an associated index header file that includes a deletion data structure. If each bit in the deletion data structure is set to '0', indicating that a delete request for each entry in the container index file has been received, then both the index header file and the container index file may be deleted in accordance with one embodiment.

In one embodiment, each container file may also have a header file, called a container header file, associated with it. The container header file may be used to determine when a container file may be deleted. For example, a container header file may indicate how many content units are stored in its associated container file and how many of these content units have been deleted. Thus, for example, when processing software 305 receives a request to delete a content unit, processing software 305 may determine in which container file the content unit is stored using the appropriate container index file and, in addition to updating the deletion data structure in the index header file associated with the container index file, may also update the container header file to reflect the number of content units that have been deleted from its associated container file. When the number of deleted content units is the same as the number of content units currently stored in the container file, then the container file and its associated container header file may be deleted.

The description above provides one example of a manner in which it may be determined if a content unit has been deleted and/or when a container file, container index file, and index header file may be deleted. The invention is not limited to this particular example, as any these determinations may be made in any suitable way.

As discussed above, in addition to receiving access requests to retrieve one or more particular content units (e.g., identified by content addresses), processing software 305 may also receive a query access request that requests identification of content units that satisfy one or more criteria. In one embodiment of the invention, processing software 305 may process time-based query requests that request identification of content units stored to replication target 303 during a time range specified in the request. This may be done in any suitable way, as the invention is not limited in this respect. For example, in one embodiment, in response to a query request, processing software 305 may determine which leaf directories in the time based directory structure fall within the time range specified in the request. Processing software 305 may access the container files stored in these directories and return the content addresses of content units stored therein.

In one embodiment, processing software 305 may, either, in addition to or instead of the returning the content addresses, return the content units themselves. Because a container file and its associated container header file does not include information indicating which of the content units stored in the container file have been deleted, in one embodiment processing software may, in response to the time-based query, identify content units that have been deleted, when used with such an embodiment.

To address this issue, in one embodiment, the container header file for a container file may also include a deletion data structure, similar to deletion data structure included in the index header file, that indicates which content units in the associated container file have been deleted. To maintain this data structure, when a delete request is received for a content unit, the deletion data structure in the container header file for the container file in which the content unit is stored should be updated. Further, in embodiments in which processing software 305, in response to a time based query request, returns a content address of identified content units but does not return the content unit itself, multiple container files may have to be transferred from the storage device to the memory of replication target 303 to determine the content addresses of content units that match the specified time range. Often, the container files may be large because they include the content of many content units. As a result, transferring these files from the storage device may increase latency in responding to the time based query request.

In another embodiment, rather than maintaining a deletion data structure in the container header file of a container file, a pointer to the container index file that references a content unit may be stored with the entry for each content unit in a container file. Thus, when a time-based query request is received, processing software 305 may access the container files that are stored in leaf directories that fall within the specified time range and, before identifying a content unit in response the request, may use the pointer to the container index file in the entry for the content unit to determine if the content unit is deleted (e.g., via the deletion data structure in the index header file). In this embodiment, it is not necessary to maintain a deletion data structure for each container file and update it whenever a content unit stored in the container file is deleted. Rather, a back pointer to the appropriate container index file may be included in the content unit's entry in the container file when the content unit is initially stored.

In the embodiments in which a container header file includes a deletion data structure or in which container file entries include back pointers to container index files, many large container files may be transferred from the storage device to the memory of the replication target to obtain the content address for a content unit that meets the criteria specified in a time based query request, even though the content of the content unit need not be returned in response to the request. Further, in embodiments in which HSM techniques are employed, not only would these large container files have to be moved from the storage device to the memory of the replication target, these container files may also first have to be moved from a slower storage device in the storage hierarchy (e.g., a tape drive) to the storage device which may be, for example, a disk drive.

To address this, in one embodiment a storetime container file may be employed. A storetime container file, like a container file, may correspond to a specific time period, and may have entries for content units stored during that time period. Thus, a storetime container file may be stored in the leaf directory that encompasses the time period of the storetime container file. When a content unit is initially stored in a container file, an entry for the content unit may be made in the appropriate storetime container file.

Figure 7:
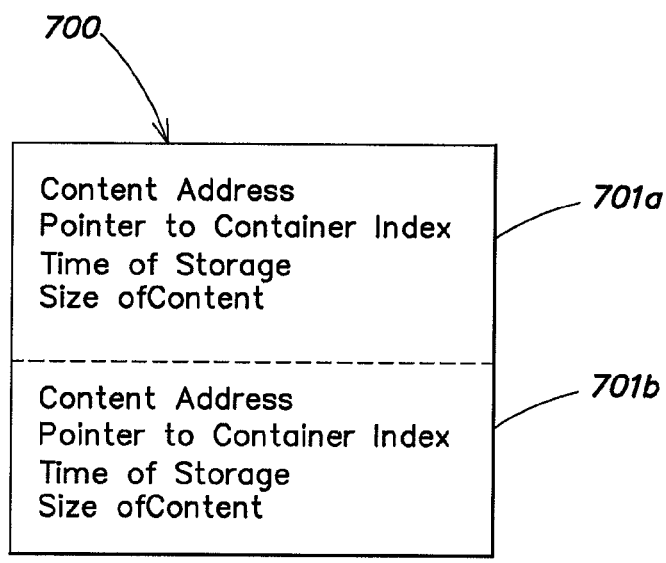
FIG. 7 is a diagram of an example of a storetime container file, in accordance with one embodiment.

An example of a storetime container file 700 is shown in FIG. 7. Storetime container file 700 includes two entries: 701a and 701b. Each of these entries corresponds to a content unit stored in a container file and may include information that may be used in responding to a time-based query request. For example, an entry may include the content address of the content unit, a pointer to the container index file that references the content unit, the time of storage of the content unit, and the size of the content of the content unit. Any other suitable information may be included, as the invention is not limited in this respect.

When a time based query request is received, processing software 305 may determine the leaf directories that correspond to the time range specified in the request and access the storetime container files stored in those directories. For each entry in the storetime container files, processing software 305 may determine if the content unit corresponding to the entry has been deleted by using the pointer to the container index file in the entry to access the deletion data structure in its associated index header file. If the content unit has been deleted, it may not be identified in response to the request. If the content unit has not been deleted, then the content address of the content unit may be returned in response to the request, along with any other suitable information, such as, for example, the time of storage of the content unit and the size of its content.

In one embodiment, a storetime header file may be created for each storetime container file. The storetime header file may be used, for example, to determine if a storetime container file may be deleted (i.e., if the content units corresponding to all the entries in the storetime container file have been deleted). The storetime header file may indicate the current number of entries in the storetime container file (which may be updated when entries are added to the storetime container file) and may indicate the number of entries that correspond to deleted content units (which may be updated each time a content unit corresponding to one of the entries is deleted). If the number of entries corresponding to deleted content units is the same as the number of entries in the storetime container file, then storetime container file may be deleted (e.g., by processing software 305)

In one embodiment, in addition to responding to query requests to identify content units stored during a specified time range, processing software 305 may respond to query requests to identify content units deleted during a specified time range. This may be done in any suitable way, as the invention is not limited in this respect.

Figure 8:
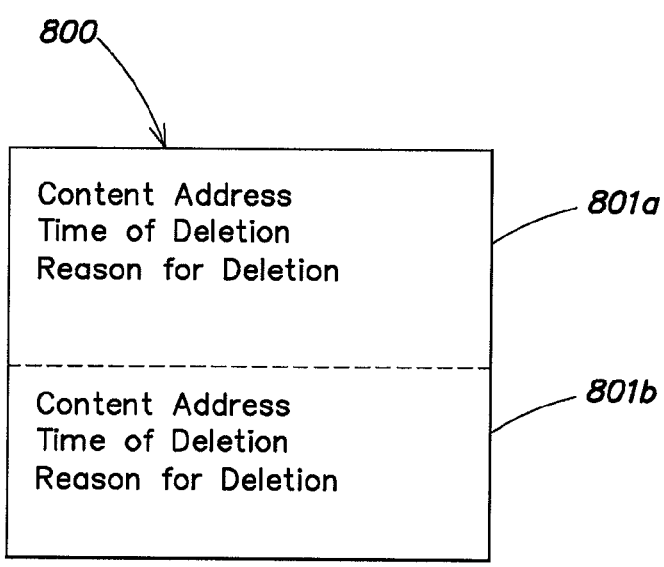
FIG. 8 is a diagram of an example of a deletion container file, in accordance with one embodiment.

For example, a deletion container file may be created that corresponds to a particular time period and may have entries for content units deleted during that time period. The deletion container file may be stored in the leaf directory that corresponds to the time period of the deletion container file. When a content unit is deleted, an entry for the content unit may be made in the deletion container file that encompasses the time of deletion of the content unit. An example of a deletion container file 800 that includes two entries, 801a and 801b, is shown in FIG. 8. Each entry in the deletion container file may correspond to a deleted content unit and include any suitable information. For example, an entry may include the content address of the deleted content unit, the time of deletion, and the reason for deletion.

When a query request is received requesting identification of content units deleted during a specified time range, processing software 305 may determine the leaf directories that correspond to time periods falling within the specified time range. Processing software 305 may then access the deletion container files stored in these directories and return information for each content unit identified in the deletion container files. Any suitable information may be returned, as the invention is not limited in this respect. For example, in response to the query request, the content address of content units deleted during the time range may be returned, along with the time of deletion of the content units and the reason for deletion.

The aspects of the present invention described herein can be used with systems that store two different types of content units: blobs and content descriptor files (CDFs), with each blob being referenced by at least one CDF. A blob may store application data, while a CDF that references the blob may store metadata about the blob. Accessing entities may not directly access blobs and may only directly access CDFs. Thus, an accessing entity may not be aware of the content address of a blob, but only the content address of a CDF. To access a blob, an accessing entity may send a request for the CDF that references the blob. In response, the accessing entity may receive the requested CDF and the blobs referenced by the CDF. In this regard, an accessing entity may also not directly request deletion a blob. The accessing entity may request deletion of a CDF that references the blob. If there are no CDFs referencing a blob, the blob may be deleted.

In one embodiment, separate container files may be used for blobs and CDFs. Thus, a leaf directory in the time based directory structure may have some blob container files and some container files (i.e., if there were blob(s) and CDF(s) stored to replication target 303 during the time period of the leaf directory). Similarly, separate container index files may be used for blobs and CDFs. As mentioned above, in one embodiment, blobs may not be directly deleted by an accessing entity. Thus, in one embodiment, rather than including a deletion data structure in the index header file associated with a blob container index file associated, the index header file may include a reference count map. The reference count map includes an entry for each blob entry in the blob container index file that indicates how many CDFs are referencing the blob. The reference count map for a blob may be updated when a new CDF is created that references the blob or when a CDF referencing the blob is deleted. In this respect, if every entry in the reference count map is '0', indicating that there are no CDFs referencing any of the blobs referenced in the blob index container file, then the blob index file may be deleted.

As mentioned above, container files may be deleted when the information in the container header file indicates that all content units stored in the container file are deleted. However, in one embodiment that employs blob and CDF content unit types, CDF container files may not be deleted, even if it is determined that every CDF stored in the CDF container file has been deleted. This may be done for any suitable reason and the invention is not limited in this respect. For example, the CDF container file may serve as an audit log, such that information about deleted CDFs (and deleted blobs referenced by the deleted CDFs) still exists on the replication target and may be used to determine information about the deleted content units. In embodiments in which CDF container files are not deleted, it may not be necessary to maintain a container header file for CDF container files. Because the container header file is primarily used to determine if its associated container file may be deleted (i.e., by determining if all content units in its associated container file have been deleted) and because CDF container files are not deleted, it may not be necessary to create and maintain a container header file for CDF container files.

Applicants have appreciated that, in some situations, it may be desirable to allow storage of a particular content unit only one time. Thus, if a user attempts to store a content unit that is already stored on the computer, the computer may bypass storage of the content unit, so that two copies of the same content unit are not stored on the storage system. However, from the perspective of the entity requesting storage of the content unit, the storage system has accepted and processed the storage request. This may be done in any suitable way, as the invention is not limited in this respect.

In one embodiment where content addresses for content units do not include a timestamp, when a request to write a content unit is received, the content address may be input to a hash function to derive a time value, as discussed above. This time value may be used to select a directory that stores a container index file for the content unit. The appropriate container index file corresponding to the time value may be selected and it may be determined if there is another content unit having the same content address already stored therein. If there is another content unit with the same content address stored therein, another copy of the content unit need not be saved in a container file in the time based directory structure. However, the reference count for the content unit in the reference count map discussed above may be incremented so that a request from a first entity that stored a first copy of the content unit to delete the content unit will not result in deletion of the content unit so that a second entity that stored a second copy of the content unit may still access the content unit.

In embodiments in which content addresses for content units include timestamps indicating an initial time of storage of the content unit, two copies of the same content unit may have different timestamps in their content addresses. Thus, when a request to store a content unit is received, it may be difficult to determine if a previous copy of the content unit has been stored. To address this, in one embodiment a single instance store (SIS) file may be employed. When a request to write a content unit is received, in addition to storing an entry for the content unit in a container index file and storing the content unit in a container file, the content address (or a portion of the content address) of the content unit may be input into a hash function that outputs a time value based, at least in part, on the content address. The timestamp may be removed from the content address prior to inputting the content address into the hash function such that the hash function only operates on the portion of the content address that is generated using the content of the content unit. An SIS file corresponding to the content unit may be created in the time based directory corresponding to the time value output by the hash function. The SIS file may indicate the content address of the content unit. The SIS file may further indicate the location of and identify the container index file which includes an entry for the content unit. When a write request to store another content unit having the same content is received, processing software 305 (FIG. 3) may input the portion of the content address generated using the content of the content unit to the hash function to generate a time value. The directory corresponding to the time value may be located and it may be determined if there is an SIS file that includes the content address (excluding the timestamp) of the content unit. When the SIS file is found, the container index file corresponding to the first copy of the content unit may be located and the location of the container file that stores the first copy of the content unit may be determined. Then, an entry may be made for the second copy of the content unit in a container index file in the directory corresponding to the timestamp in the content address of the second copy of the content unit. The entry may indicate as the location of the content unit the container file that stores the first copy of the content unit. In this manner, a second copy of the content unit need not be stored, but the content may be located using either the content address of the first copy of the content unit or the content address of the second copy of the content unit.

In one embodiment, the aspect of the present invention described herein can be used in systems that employ virtual pools. Virtual pools are discussed in detail in application Ser. Nos. 10/910,985, 10/911,330, 10/911,248, 10/911,247, and 10/911,360, listed in Table 1 below. Content units may be logically grouped together for any suitable reason. For example, content units may be grouped together to control access to certain content units. That is, a first host computer may only be permitted to access content units in Virtual Pool A, while a second host computer may only be permitted to access content units in Virtual Pool B.

In one embodiment, information may be included, in an index container file, storetime container file, and/or deletion container file, indicating in which virtual pool(s) the content unit referenced by that entry belongs (if any). When an access request (e.g., a read, write or query request) is received, processing software 305 may determine in which virtual pool each requested content unit belongs and determine if the requesting entity is permitted to access the virtual pool(s) before responding to the request.

Many of the examples described above employed the use of a time based directory structure. In some of the examples, the use of time based directory structure is convenient because the content address for content units to be stored included a timestamp which aided in selection of directory in which to store the content unit. Further, the time based directory structure can be used to aid in locating content units when responding to a time based query request or a deletion time based query request. However, it should be appreciated the invention is not limited to use in a time-based directory structure. Indeed, the file system directory structure may be organized in any suitable way. For example, the directory structure may be organized based on the hash value in the content addresses of content units, rather than time, or in other ways.

Further, in the examples described above, files (e.g., container files, container index files, storetime container files, and deletion container files, and their associated header files) are stored in the leaf directories of the directory structure. The invention is not limited to storing the above-described files in leaf directories, as such files may be stored in any suitable directory in the directory structure, as the invention is not limited in this respect.

Further, in many of the examples above a content address was used as the identifier in identifying content units. The invention is not limited to use with a content address as the identifier as any suitable identifier may be used.

Additionally, many of the examples provided above are described in the context of a storage system replicating content units to a replication target (e.g., a host computer). The invention is not limited to use with systems that employ replication, as embodiments of the invention may be used in any suitable system configuration. For example, embodiments of the invention may be used on a system (e.g., a host computer) that is used as the primary storage location of content units instead of, or in addition to, serving as the backup storage location (i.e., the replication target).

The above-described embodiments of the present invention can be implemented on any suitable computer or system. Examples of suitable computers and/or systems are described in the patent applications listed below in Table 1 (collectively "the CAS applications"), each of which is incorporated herein by reference. It should be appreciated that the computers and systems described in these applications are only examples of computers and systems on which the embodiments of the present invention may be implemented, as the invention is not limited to implementation on any of these content addressable storage systems, or to content addressable storage systems at all.

TABLE 1

| Title | Ser. No. | Filing Date |
| --- | --- | --- |
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention | 10/762,044 | Jan. 21, 2004 |

TABLE 1-continued

| Title | Ser. No. | Filing Date |
|---|---|---|
| Period For Data In A Storage System | | |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of managing content units in a file system installed on a computer system comprising at least one input, and at least one controller coupled to the at least one input and configured to store content units in the file system, the method comprising acts of:

receiving via the at least one input, a first request to store a first content unit, the first content unit having a first content address that is computed, at least in part, by hashing the content of the first content unit;

in response to the first request, storing the first content unit in a file in the file system;

receiving via the at least one input, a second request to store a second content unit, the second content unit having a second address that is computed, at least in part, by hashing the content of the second content unit;

in response to the second request, storing the second content unit in the same file in which the first content unit is stored and in a manner that enables the first and second content units to be separately accessible;

receiving a third request to store a third content unit, the third content unit having a same content as the first content unit;

determining that the first and third content units have the same content; and in response to determining that the first and third content units have the same content, declining to store the third content unit.

2. The method of claim 1, wherein the file system includes a time-based directory structure having a plurality of directories, wherein each of the plurality of directories corresponds to a period of time, and wherein the file is stored in one of the plurality of directories that corresponds to a period of time during which the first and second request requests were received.

3. The method of claim 1, further comprising acts of:
receiving a fourth request to access the third content unit; and
in response to the fourth request, returning the first content unit.

4. The method of claim 1, wherein the file is a first file, and wherein the method further comprises an act of:
storing information in a second file in the file system indicating the location of the first content unit within the first file; and
storing information in the second file indicating the location of the second content unit within the first file.

5. The method of claim 1, wherein the file in which the first content unit and the second content unit are stored is not a folder or directory in the file system.

6. The method of claim 1, wherein the file system imposes a limit on a number of files that may be stored on the file system, and wherein storing the second content unit in the same file in which the first content unit is stored enables the number of content units stored in the file system to exceed the limit.

7. The method of claim 1, wherein the first request is a request to replicate the first content unit from a storage system that stores the first content unit.

8. The method of claim 2, further comprising an act of:
creating an entry for the first content unit in an index file, the entry identifying the file that stores the first content unit and wherein the index file is stored in one of the plurality of directories that corresponds to an index time for the first content unit.

9. The method of claim 8, wherein the first request is a request to replicate the first content unit from a storage system that stores the first content unit and wherein the index time is a time related to the time of storage of the first content unit on the storage system.

10. The method of claim 8, wherein the index time is a time related to the time of receipt of the first request.

11. The method of claim 8, wherein the index time is a time derived from the content address of the first content unit.

12. The method of claim 11, wherein the time derived from the content address of the first content unit is derived from a portion of the content address that is based on the content of the first content unit.

13. The method of claim 2, where the first request is received from a storage system that stores the first content unit, and wherein the first content address includes a timestamp that indicates a time related to the time of storage of the first content unit on the storage system.

14. The method of claim 13, wherein the file corresponds to a period of time that includes the times at which the first and second requests were received.

15. The method of claim 13, wherein the file corresponds to a period of time that is subsumed by the period time of the one of the plurality of directories in which the file is stored.

16. The method of claim 13, further comprising acts of:
in response to the first request, determining one the plurality of directories that corresponds to a period of time that includes the time indicated in the timestamp; and
storing, in the one the plurality of directories that corresponds to a period of time that includes the time indicated in the timestamp, an indication of the file that stores first the content unit.

17. The method of claim 16, further comprising an act of:
in response to the first request, associating an identifier with the first content unit.

18. The method of claim 17, where the identifier is the first content address.

19. The method of claim 17, further comprising an act of:
returning the identifier as acknowledgement of receipt of the first request.

20. The method of claim 17, further comprising acts of:
receiving a fourth request to access the first content unit, the fourth request identifying the first content unit using the identifier;
locating the indication of the file that stores first the content unit using the identifier;
locating the file that stores the first content unit based on the indication;
locating the first content unit in the file; and
returning the first content unit in response to the fourth request.

21. At least one computer readable medium encoded with instructions that, when executed on a computer system, perform a method of managing content units in a file system, the method comprising acts of:
receiving a first request to store a first content unit, the first content unit having a first content address that is computed, at least in part, by hashing the content of the first content unit;
in response to the first request, storing the first content unit in a file in the file system;
receiving a second request to store a second content unit, the second content unit having a second address that is computed, at least in part, by hashing the content of the second content unit; and
in response to the second request, storing the second content unit in the same file in which the first content unit is stored and in a manner that enables the first and second content units to be separately accessible;
receiving a third request to store a third content unit, the third content unit having a same content as the first content unit;
determining that the first and third content units have the same content; and in response to determining that the first and third content units have the same content, declining to store the third content unit.

22. The at least one computer readable medium of claim 21, wherein the first request is a request to replicate the first content unit from a storage system that stores the first content unit.

23. The at least one computer readable medium of claim 21, wherein the method further comprising acts of:
receiving a fourth request to access the third content unit; and
in response to the fourth request, returning the first content unit.

24. The at least one computer readable medium of claim 21, wherein the file is a first file, and wherein the method further comprises an act of:
storing information in a second file in the file system indicating the location of the first content unit within the first file; and
storing information in the second file indicating the location of the second content unit within the first file.

25. The at least one computer readable medium of claim 21, wherein the file system includes a time-based directory structure having a plurality of directories, wherein each of the plurality of directories corresponds to a period of time, and wherein the file is stored in one of the plurality of directories that corresponds to a period of time during which the first and second request requests were received.

26. The at least one computer readable medium of claim 25, wherein the method further comprises an act of:
creating an entry for the first content unit in an index file, the entry identifying the file that stores the first content unit and wherein the index file is stored in one of the plurality of directories that corresponds to an index time for the first content unit.

27. The at least one computer readable medium of claim 26, wherein the first request is a request to replicate the first content unit from a storage system that stores the first content unit and wherein the index time is a time related to the time of storage of the first content unit on the storage system.

28. The at least one computer readable medium of claim 26, wherein the index time is a time related to the time of receipt of the first request.

29. The at least one computer readable medium of claim 26, wherein the index time is a time derived from the content address of the first content unit.

30. The at least one computer readable medium of claim 29, wherein the time derived from the content address of the first content unit is derived from a portion of the content address that is based on the content of the first content unit.

31. The at least one computer readable medium of claim 25, where the first request is received from a storage system that stores the first content unit, and wherein the first content address includes a timestamp that indicates a time related to the time of storage of the first content unit on the storage system.

32. The at least one computer readable medium of claim 31, wherein the file corresponds to a period of time that includes the times at which the first and second requests were received.

33. The at least one computer readable medium of claim 31, wherein the file corresponds to a period of time that is subsumed by the period time of the one of the plurality of directories in which the file is stored.

34. The at least one computer readable medium of claim 31, wherein the method further comprises acts of:

in response to the first request, determining one the plurality of directories that corresponds to a period of time that includes the time indicated in the timestamp; and
storing, in the one the plurality of directories that corresponds to a period of time that includes the time indicated in the timestamp, an indication of the file that stores first the content unit.

35. The at least one computer readable medium of claim 34, wherein the method further comprises an act of:
in response to the first request, associating an identifier with the first content unit.

36. The at least one computer readable medium of claim 35, where the identifier is the first content address.

37. The at least one computer readable medium of claim 35, wherein the method further comprises an act of:
returning the identifier as acknowledgement of receipt of the first request.

38. The at least one computer readable medium of claim 35, wherein the method further comprises acts of:
receiving a fourth request to access the first content unit, the fourth request identifying the first content unit using the identifier;
locating the indication of the file that stores first the content unit using the identifier;
locating the file that stores the first content unit based on the indication;
locating the first content unit in the file; and
returning the first content unit in response to the fourth request.

39. A computer system that manages content units in a file system comprising:
at least one input; and
at least one controller coupled to the at least one input that:
receives, via the input, a first request to store a first content unit, the first content unit having a first content address that is computed, at least in part, by hashing the content of the first content unit;
in response to the first request, stores the first content unit in a file in the file system;
receives, via the input, a second request to store a second content unit, the second content unit having a second address that is computed, at least in part, by hashing the content of the second content unit;
in response to the second request, stores the second content unit in the same file in which the first content unit is stored and in a manner that enables the first and second content units to be separately accessible; p2 receives a third request to store a third content unit, the third content unit having a same content as the first content unit;
determines that the first and third content units have the same content; and
in response to determining that the first and third content units have the same content, declines to store the third content unit.

40. The computer of claim 39, wherein the first request is a request to replicate the first content unit from a storage system that stores the first content unit.

41. The computer of claim 39, wherein the at least one controller:
receives, via the input, a fourth request to access the third content unit; and
in response to the fourth request, returns the first content unit.

42. The computer of claim 39, wherein the at least one controller further comprises means for:

receiving, via the input, a first request to store a first content unit, the first content unit having a first content address that is computed based, at least in part, on the content of the first content unit;

in response to the first request, storing the first content unit in a file in the file system;

receiving, via the input, a second request to store the second content unit, the second content unit having a second address that is computed based, at least in part, on the content of the second content unit; and in response to the second request, storing the second content unit in the file.

43. The computer of claim 39, wherein the file is a first file, and wherein the at least one controller:

stores information in a second file in the file system indicating the location of the first content unit within the first file; and stores information in the second file indicating the location of the second content unit within the first file.

44. The computer of claim 39, wherein the file system includes a time-based directory structure having a plurality of directories, wherein each of the plurality of directories corresponds to a period of time, and wherein the file is stored in one of the plurality of directories that corresponds to a period of time during which the first and second request requests were received.

45. The computer of clam 44, wherein the at least one controller:

creates an entry for the first content unit in an index file, the entry identifying the file that stores the first content unit and wherein the index file is stored in one of the plurality of directories that corresponds to an index time for the first content unit.

46. The computer of claim 45, wherein the first request is a request to replicate the first content unit from a storage system that stores the first content unit and wherein the index time is a time related to the time of storage of the first content unit on the storage system.

47. The computer of claim 45, wherein the index time is a time related to the time of receipt of the first request.

48. The computer of claim 45, wherein the index time is a time derived from the content address of the first content unit.

49. The computer of claim 48, wherein the time derived from the content address of the first content unit is derived from a portion of the content address that is based on the content of the first content unit.

50. The computer of claim 44, where the first request is received from a storage system that stores the first content unit, and wherein the first content address includes a timestamp that indicates a time related to the time of storage of the first content unit on the storage system.

51. The computer of claim 50, wherein the at least one controller:

in response to the first request, determines one the plurality of directories that corresponds to a period of time that includes the time indicated in the timestamp; and stores, in the one the plurality of directories that corresponds to a period of time that includes the time indicated in the timestamp, an indication of the file that stores first the content unit.

52. The computer of claim 50, wherein the file corresponds to a period of time that includes the times at which the first and second requests were received.

53. The computer of claim 50, wherein the file corresponds to a period of time that is subsumed by the period time of the one of the plurality of directories in which the file is stored.

54. The computer of claim 51, wherein the at least one controller:

in response to the first request, associates an identifier with the first content unit.

55. The computer of claim 54, where the identifier is the first content address.

56. The computer of claim 54, wherein the at least one controller:

returns the identifier as acknowledgement of receipt of the first request.

57. The computer of claim 54, wherein the at least one controller:

receives, via the input, a fourth request to access the first content unit, the fourth request identifying the first content unit using the identifier;

locates the indication of the file that stores first the content unit using the identifier;

locates the file that stores the first content unit based on the indication;

locates the first content unit in the file; and returns the first content unit in response to the fourth request.

* * * * *